United States Patent
Kuan et al.

(10) Patent No.: US 7,366,899 B2
(45) Date of Patent: Apr. 29, 2008

(54) ARCHITECTURE AND METHOD OF MULTILAYERED DRM PROTECTION FOR MULTIMEDIA SERVICE

(75) Inventors: Cheng-Peng Kuan, Taipei (TW); Yu-Jen Lin, Chiayi Hsien (TW); Wen-Hao Chung, Sanchong (TW); Yun-Ei Wu, Jhongli (TW)

(73) Assignee: Industrial Technology Research Institute, Hsinchu (TW)

( * ) Notice: Subject to any disclaimer, the term of this patent is extended or adjusted under 35 U.S.C. 154(b) by 793 days.

(21) Appl. No.: 10/839,506

(22) Filed: May 4, 2004

(65) Prior Publication Data

US 2005/0094810 A1 May 5, 2005

(30) Foreign Application Priority Data

Nov. 5, 2003 (TW) .............................. 92130956 A

(51) Int. Cl.
*H04L 9/00* (2006.01)
(52) U.S. Cl. ...................... 713/167; 713/168; 380/200; 380/277; 705/51; 705/57
(58) Field of Classification Search ........ 713/167–168, 713/189; 726/1; 705/51, 57; 380/200, 277
See application file for complete search history.

(56) References Cited

U.S. PATENT DOCUMENTS

| | | | | |
|---|---|---|---|---|
| 6,055,314 | A | 4/2000 | Spies et al. | 380/21 |
| 6,363,488 | B1 | 3/2002 | Ginter et al. | 713/201 |
| 6,381,747 | B1 | 4/2002 | Wonfer et al. | 725/104 |
| 6,530,021 | B1 | 3/2003 | Epstein et al. | 713/176 |
| 6,983,371 | B1 * | 1/2006 | Hurtado et al. | 713/189 |
| 7,103,574 | B1 * | 9/2006 | Peinado et al. | 705/51 |

OTHER PUBLICATIONS

Windows Media'9 Series, "Architecture of Windows Media Rights Manager", 2004 Microsoft Corporation, "http://www.microsoft.com/windows/windowsmedia/WM7/DRM/architecture.aspx".
Digital Video Broadcasting, "Support For Use Of Scrambling And Conditional Access Within Digital Broadcasting Systems", DVB Project Office Feb. 28, 1997, P.2-P.7.
Lecture, "Technologies And Services on Digital Broadcasting (6)", Broadcast Technology No. 12, Autumn 2002, P10-P13.
Advanced Television Systems Committee, Conditional Access System For Terrestrial Broadcast And Amendment No. 1, Doc.A/70, Jul. 17, 1999, Amendment No. 1-31 May 2000.

* cited by examiner

*Primary Examiner*—Thanhnga Truong

(57) ABSTRACT

An architecture of multilayered DRM protection structure for multimedia service and the method of forming the same are provided. The architecture comprises a multilayered DRM encryption structure and a DRM decryption structure. The inputted multimedia service is decomposed and encrypted into an encrypted multimedia service stream through a multimedia service decomposer and a multimedia DRM organizer. The encrypted stream is decrypted by a DRM composer from top layer to bottom layer. A full or partial multimedia service is then presented. For a multimedia service application, this enhances the DRM protection by increasing the complexity of multimedia encryption for a multimedia service application. It also provides the variety for the multimedia service application via different compositions of multimedia objects. The DRM protection structure is embedded into each layer of multimedia services and objects and can be set up different levels of DRM protection.

16 Claims, 21 Drawing Sheets

ARCHITECTURE AND METHOD OF MULTILAYERED DRM PROTECTION FOR MULTIMEDIA SERVICE

FIELD OF THE INVENTION

The present invention generally relates to encryption and protection of multimedia service applications, and more specifically to an architecture of multilayered digital rights management (DRM) protection structure for multimedia services and the method of forming the same.

BACKGROUND OF THE INVENTION

A multimedia service application is different from the service in the past that provided only voices and images. Nowadays, it provides various multimedia objects for a service, and can be the combination of audios, videos, natural or synthetic graphics, images, text and other various multimedia objects. It can also be a combination of multimedia service applications. Current protection to this complicated multimedia service application is only performing encryption and protection on transported multimedia objects. This is not good enough. In order to avoid illegal access or piracy during transporting a multimedia service application, a digital rights management protection will be added to the transport stream.

Usually, multimedia protection system encrypts only on transport or delivery. As the encryption and protection mechanism on transport channel is broken, the content of the transported multimedia information may be illegally used. Although a few architectures did encryption and protection on multimedia objects, they cannot perform different combinations of rights protection to individual multimedia object. Therefore, neither the variety for the multimedia service application with different compositions of multimedia objects can be provided, nor the multilayered digital rights management can be performed according to the user's degree of authorization.

The protection mechanism for multimedia information by Microsoft Media 9 Series DRM system is the same as traditional way, as shown in FIG. 1. The protection is made on transport channel. Digital content providers can use license registration and media file encryption to protect their digital rights. For example, digital contents, such as audio or video, are encrypted into "Windows Media Audio format (.wma)" or "Windows Media Video format (.wma)".

Scrambling system for digital television performs encryption and protection on transport streams too. Therefore, as the encryption and protection mechanism on transport channel is broken, the content of the transported multimedia information may be illegally used. The Advanced Television Systems Committee (ATSC), an international non-profit organization developing voluntary standards for digital television, uses Block Cipher of TDES on transport packet level to perform scrambling, as shown in FIG. 2. The Digital Video Broadcasting Project (DVB) uses Block Cipher first, then Stream Cipher on PES or transport packet level is used to perform scrambling, as shown in FIG. 3.

The DRM technology disclosed by U.S. Pat. No. 6,363,488 of InterTrust allows user to access multimedia information distributed by virtual distribution environment (VDE) only under authorization. Therefore, it emphasizes how to safely transport multimedia information.

The DRM technology disclosed by U.S. Pat. No. 6,381,747 of MacroVision authorizes service provider to encrypt multimedia information. Service provider can change the way of encryption during transport. Therefore, this disclosure emphasizes the encryption and protection during transport.

The decryption key of the DRM technology disclosed by U.S. Pat. No. 6,055,314 of Microsoft can be stored in an IC card. The encrypted multimedia information can be transported safely when consuming, and users can use the decryption key in this IC card for decryption. Therefore, this disclosure emphasizes the encryption and protection during transport too.

The DRM technology disclosed by U.S. Pat. No. 6,530,021 of Philips uses watermarking for copy protection and encrypts the multimedia information with watermarking.

These disclosures emphasize the encryption and protection on multimedia information or the encryption and protection during transport. Even some of them do encryption and protection to multimedia objects in a multimedia service application; their levels of protection are simple and their protections are easy to be broken.

For arts mentioned above, as the encryption and protection mechanism on transporting channel is broken, the content of the transported multimedia information may be illegally used. Also, rights owners or service providers can not set up different levels of DRM protection to each multimedia object in a multimedia service application. They cannot provide the variety for the multimedia service application with different composition of multimedia objects, but only can provide total service to the same level of digital rights management protection. Therefore, they cannot have different levels of usage in the same multimedia service application according to the user's or consumer's degree of authorization.

SUMMARY OF THE INVENTION

The present invention has been made to overcome the above-mentioned drawback of conventional multimedia service applications and DRM techniques. The primary object of the present invention is to provide an architecture of multilayered DRM protection structure for multimedia services. It not only provides digital rights protection for multimedia objects to enhance the protection for multimedia information but also provides the multimedia service applications the ability of various service combinations and more degree of freedom on DRM protection.

The architecture of multilayered DRM protection structure of the invention comprises mainly a multilayered DRM encryption structure and a DRM decryption structure. The multilayered DRM encryption structure decomposes mainly an inputted multimedia service and encrypts it into an encrypted multimedia service (EMS) stream through a multimedia service decomposer (MSD) and a multimedia DRM organizer (MDO). The DRM decryption structure decrypts mainly the encrypted stream by a DRM composer from top layer to bottom layer. A full or partial multimedia service is then presented.

According to the present invention, the architecture of multilayered DRM protection structure enhances the DRM protection by increasing the complexity of multimedia encryption for a multimedia service application. It also provides the variety for the multimedia service application via different compositions of multimedia objects. The DRM protection structure is embedded into each layer of multimedia services and objects to set up different levels of DRM protection.

This invention specifically describes all functions and processing steps of each unit in the multilayered DRM encryption structure and the DRM decryption structure. Then, it describes all items mentioned above in more detail by accompanying drawings. The invention also describes all processing steps and their results by an example of a full multimedia service.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 4b shows the processing step of the multimedia service decomposer shown in FIG. 4a.

FIG. 4c shows the processing step of the multilayered DRM organizer shown in FIG. 4a.

FIG. 6b shows the processing steps of the DRM multimedia service composer shown in FIG. 6a.

FIG. 6c shows the processing steps of the multimedia service composer shown in FIG. 6a.

FIG. 8a shows the processing steps of the SMS encoder shown in FIG. 4a.

FIG. 8b shows the processing steps of the SMS decoder shown in FIG. 6a.

FIG. 9a shows the processing steps of the BMO encoder shown in FIG. 4a.

FIG. 9b shows the processing steps of the BMO decoder shown in FIG. 6a.

DETAILED DESCRIPTION OF THE PREFERRED EMBODIMENTS

Figure 1:
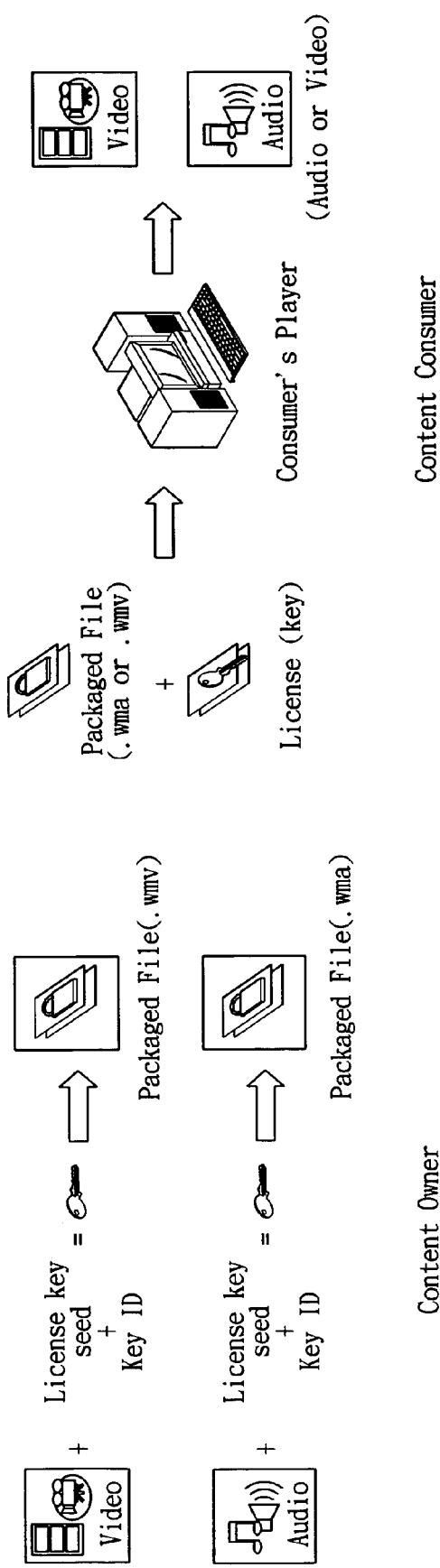
FIG. 1 shows a Microsoft Media 9 Series DRM system.
Figure 2:
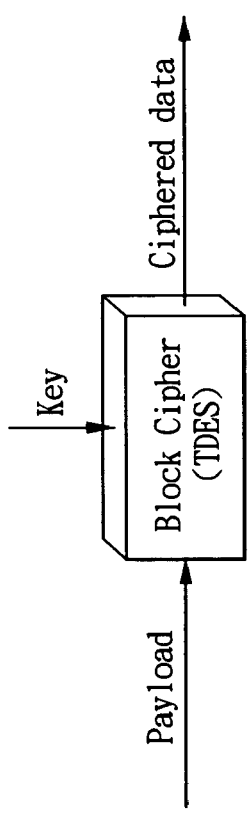
FIG. 2 shows an encryption/scrambling system by the ATSC, an international, non-profit organization developing voluntary standards for digital television.
Figure 3:
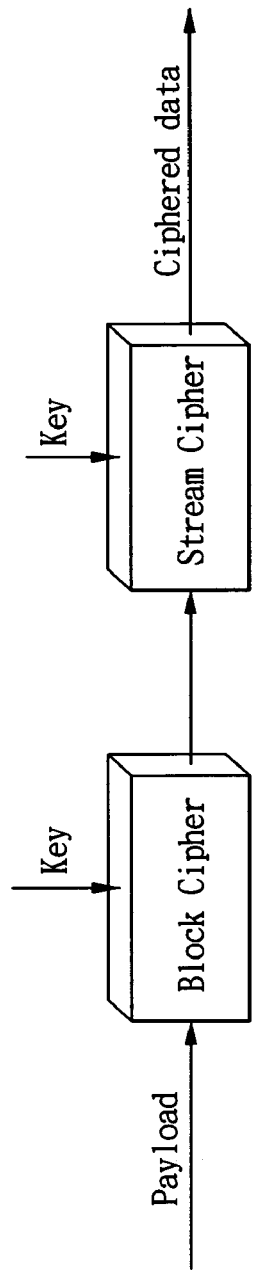
FIG. 3 shows an encryption/scrambling by the DVB Project.
Figure 4A:
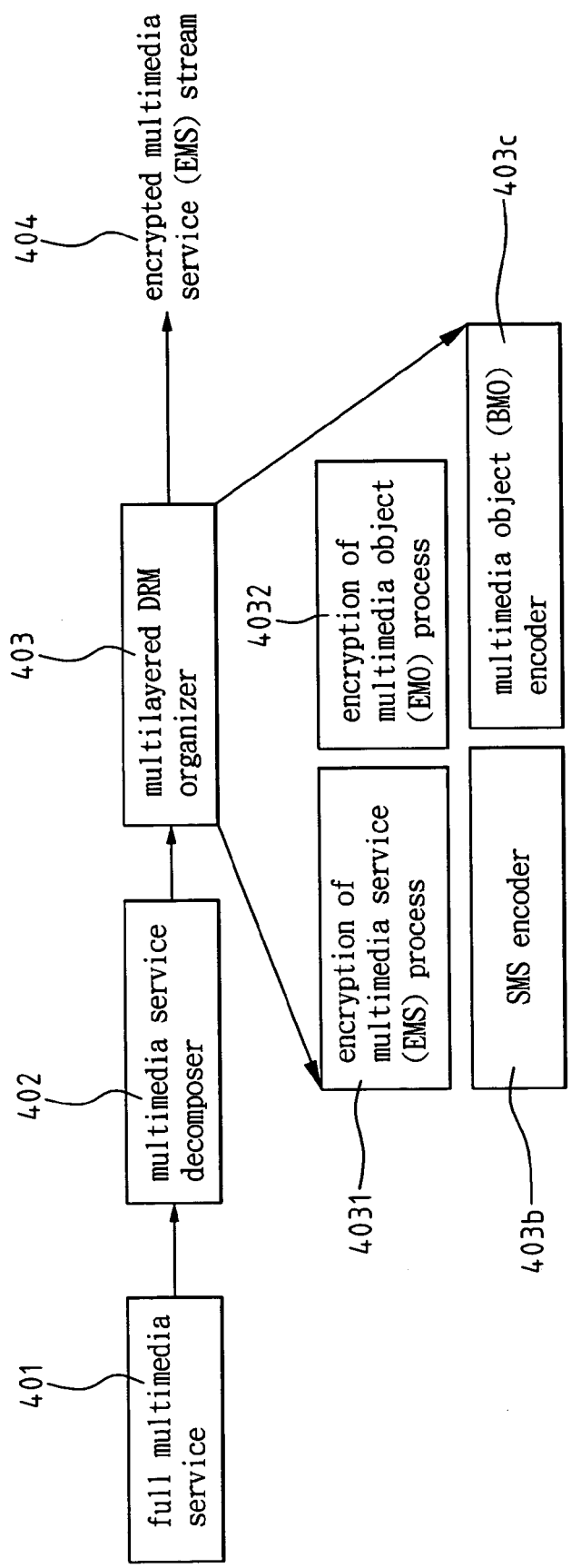
FIG. 4a shows a block diagram of a multilayered DRM encryption structure according to the present invention.

A DRM protection structure of the present invention mainly comprises a multilayered DRM encryption structure and a multilayered DRM decryption structure. FIG. 4a shows a block diagram of a multilayered DRM encryption structure according to the present invention. In FIG. 4a, a full multimedia service 401 generates an encrypted multimedia service (EMS) stream 404 after passing through a multimedia service decomposer 402 and a multilayered DRM organizer 403, wherein the multimedia service 401 provides users to experience various multimedia services by the usage of multimedia sources and is composed of at least one individual multimedia service and individual multimedia object (MO) of lower layer. Moreover, an individual multimedia object is the presentation of natural or artificial audio, video, figure, image, text and other multimedia source.

Figure 4B:
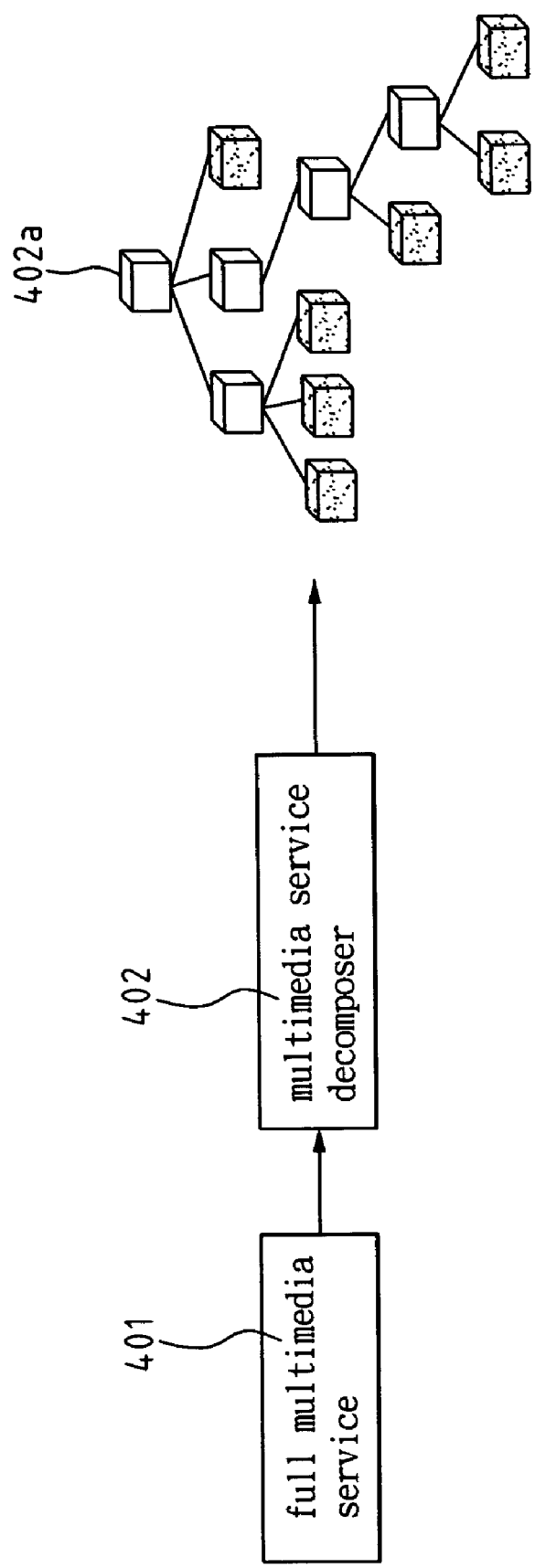

According to the present invention, the multimedia service decomposer 402 decomposes the full multimedia service 401 into the combination of at least one individual multimedia service and a multimedia object, in order to produce a multilayered structure of multimedia service (SMS) for this full multimedia service, as shown in FIG. 4b and label 402a in FIG. 4b. The multilayered SMS describes how the individual multimedia service and the individual multimedia object of lower layer combine to make a multimedia service of higher layer for the full multimedia service.

Figure 4C:
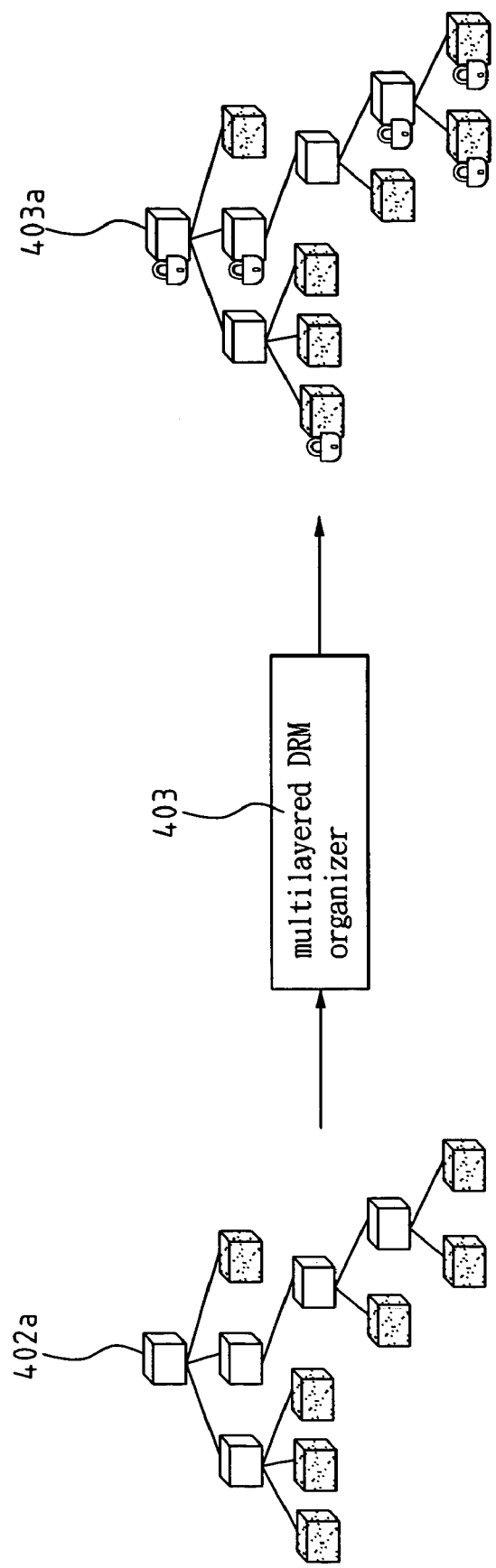

The multilayered SMS then passes to the multilayered DRM organizer 403. According to different combinations of sub-multimedia service and multimedia object by the right's owner, the multilayered DRM organizer 403 generates a multilayered DRM protected SMS, as shown in FIG. 4c and label 403a in FIG. 4c, wherein the multilayered DRM organizer 403 uses a bit-stream of multimedia object (BMO) encoder 403c to compress and encode multimedia object into a bit-stream and uses an SMS encoder 403b to compress and encode SMS into a stream that describes the structure of multimedia service. In addition, the multilayered DRM organizer 403 uses an encryption of multimedia service (EMS) process 4031 to decide which stream of multimedia service structure (SMS stream) needs to be protected and encrypted. It also uses an encryption of multimedia object (EMO) process 4032 to decide which stream of multimedia object (BMO stream) needs to be protected and encrypted.

The associated SMS that has been protected by DRM will be transmitted after forming an uppermost layered EMS stream 404. The EMS stream 404 includes all associated information of the full multimedia service.

Figure 5:
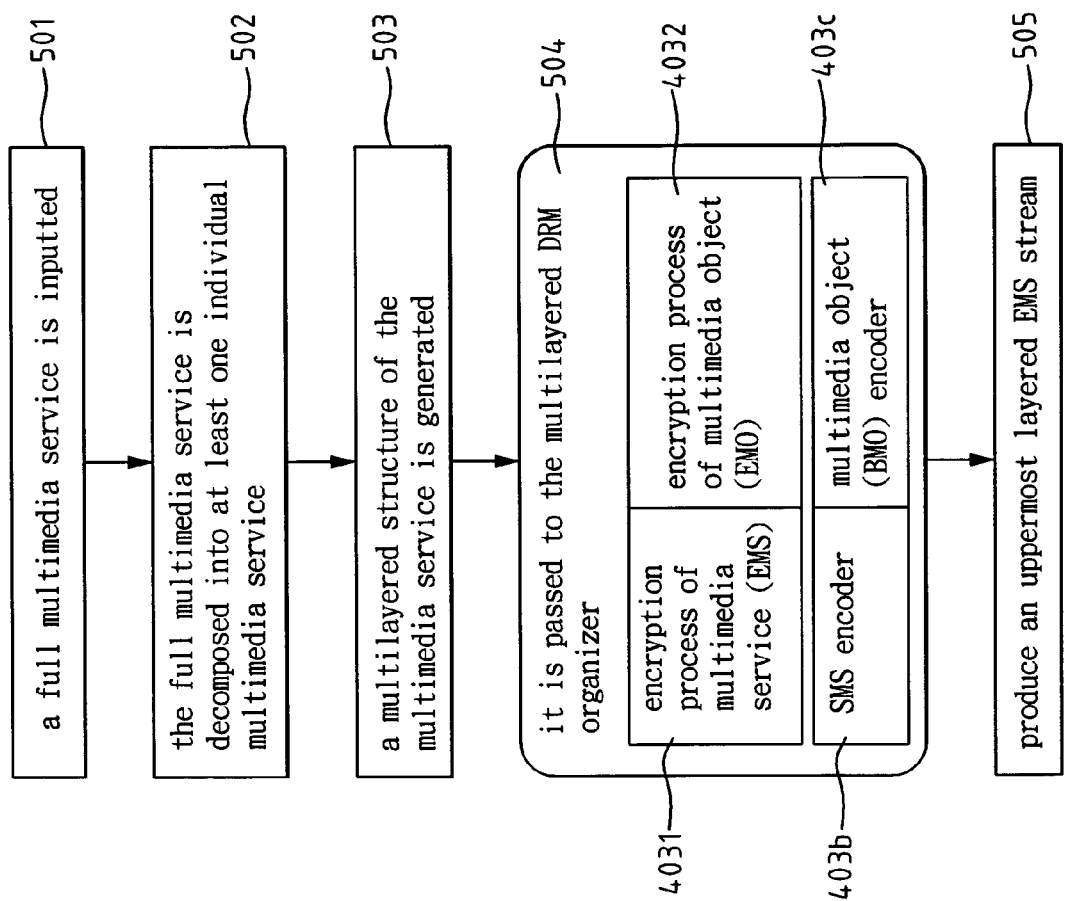
FIG. 5 shows the processing steps for the multilayered DRM encryption of the invention.

FIG. 5 shows the processing steps for the encrypted multilayered DRM of the invention according to FIGS. 4a-4c mentioned above. Referring to FIG. 5, a full multimedia service is inputted in step 501 and is decomposed into at least one individual multimedia service and a multimedia object in step 502. In step 503, a multilayered structure of the multimedia service is generated. Then it is passed to the multilayered DRM organizer 403 in step 504 to produce finally an uppermost layered EMS stream 404 in step 505. In step 504, the multilayered DRM organizer 403 performs the following works: (a) encoding all streams of describing individual multimedia object, (b) encoding every stream of describing multimedia service structure, (c) deciding which stream of multimedia service structure needs to be protected and encrypted, and (d) deciding which stream of multimedia object needs to be protected and encrypted.

Figure 6A:
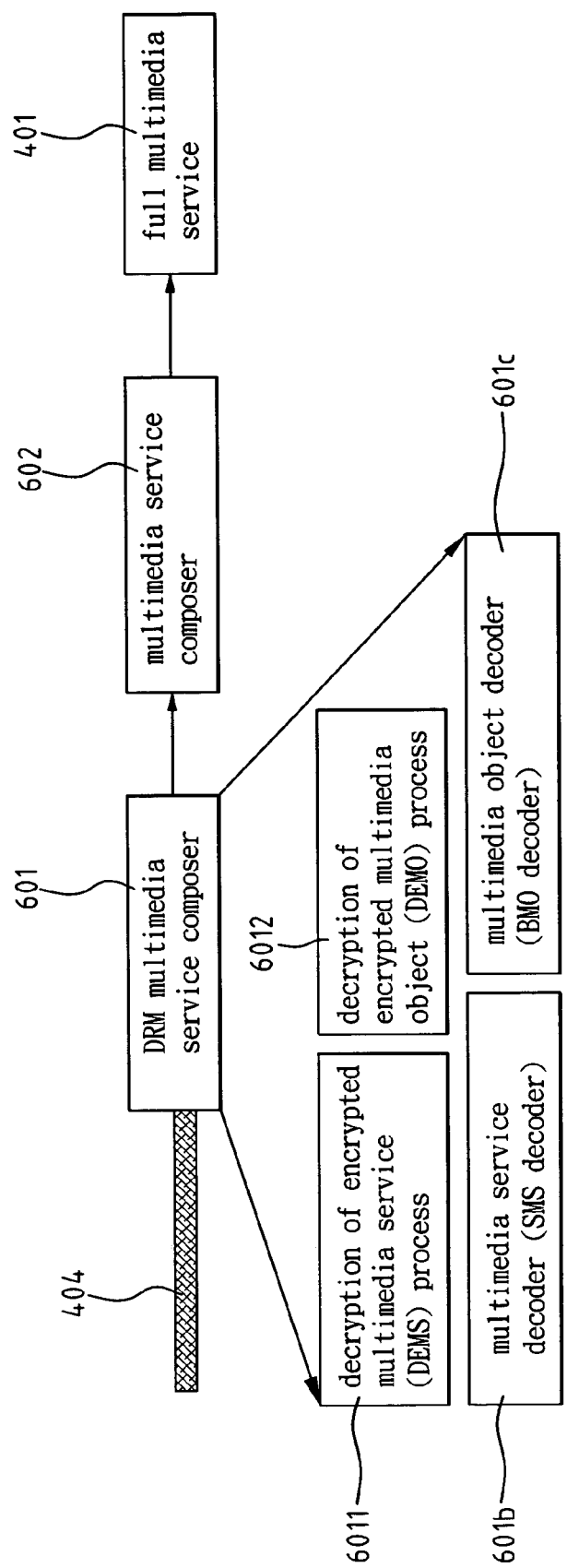
FIG. 6a shows a block diagram of a multilayered DRM decryption structure according to the present invention.

FIG. 6a shows a block diagram of a multilayered DRM decryption structure according to the present invention. In FIG. 6a, the uppermost layered EMS description stream 404 recovers to a full multimedia service 401 after passing to a DRM multimedia service composer 601 and a multimedia service composer 602.

Figure 6B:
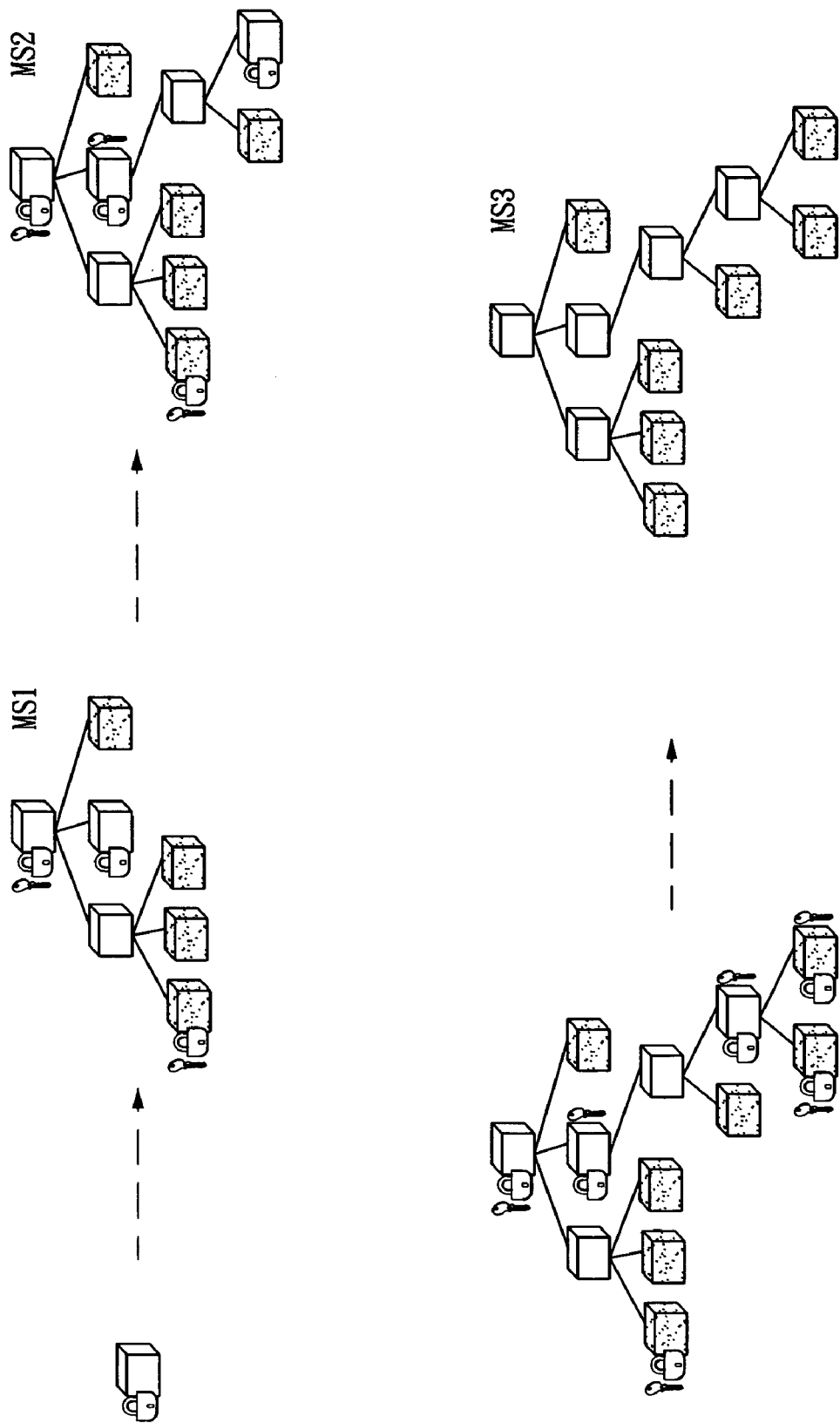

According to the present invention, the DRM multimedia service composer 601 uses a decryption of encrypted multimedia service (DEMS) process 6011 and a decryption of encrypted multimedia object (DEMO) process 6012 to decrypt the stream of EMS and the stream of EMO from top layer to bottom layer according to user- or consumer-owned decryption key bouquet and the uppermost layered EMS stream 404, as shown in FIG. 6b.

The more complete the owned decryption key bouquet is, the more complete the consumable multimedia service is, such as partial multimedia service MS1, partial multimedia service MS2, or total multimedia service MS3 in FIG. 6b. The DRM multimedia service composer 601 also uses a structure of multimedia service decoder (SMS decoder) 601b to decode every description stream of the multimedia service structure and to generate a corresponding multimedia service structure. It also uses a bit-stream of multimedia object decoder (BMO decoder) 601c to decode all described streams of multimedia object and to generate a corresponding multimedia object.

Figure 6C:
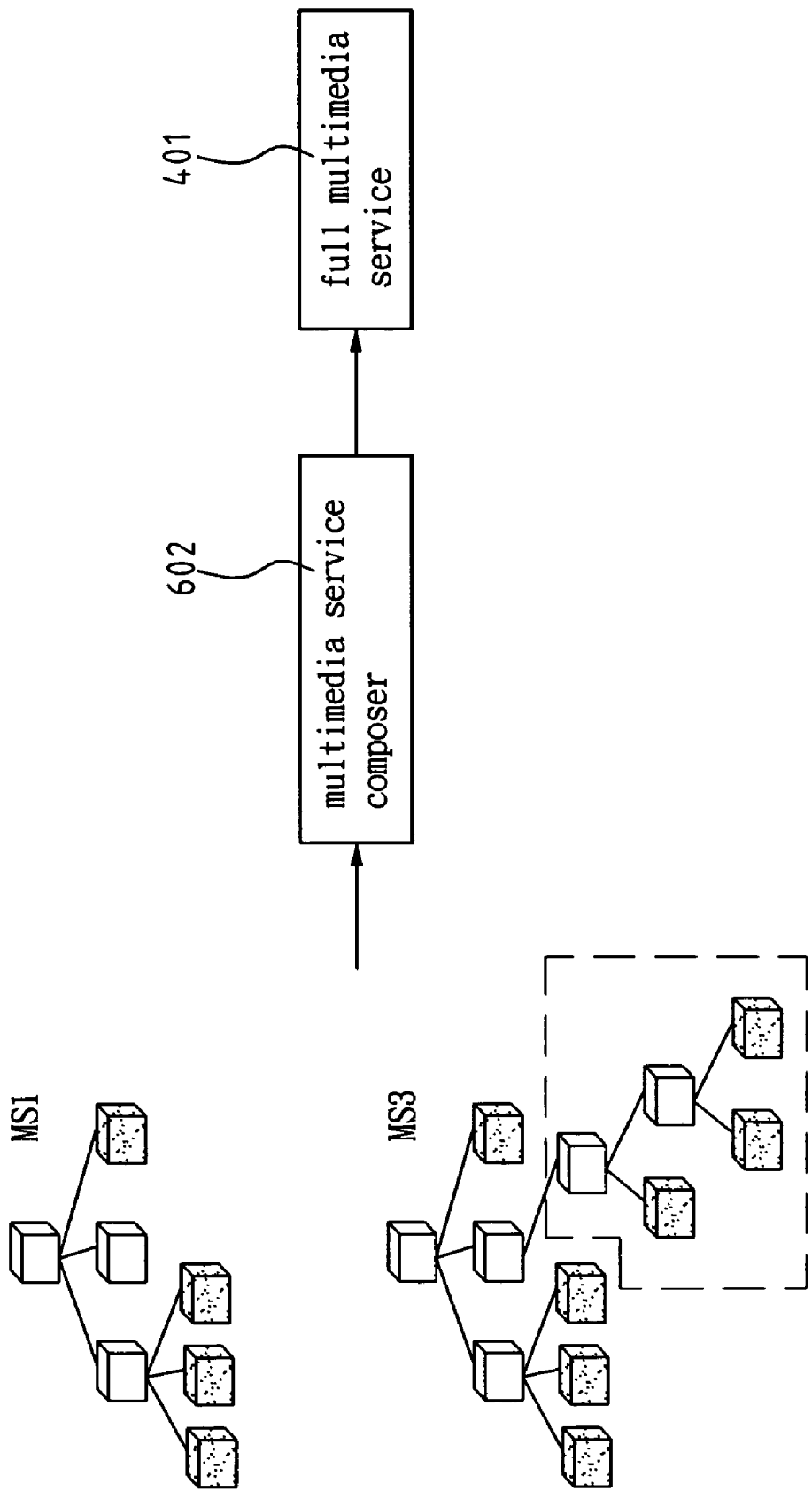

The way that these individual multimedia service structures and multimedia objects compose the full multimedia service can be understood by the decrypted stream of the structure of multimedia service. The multimedia service 401 can then be recovered after passing through the multimedia service composer 602. Partial multimedia service can also be presented specifically, as shown in FIG. 6c. The area enclosed by dotted line in FIG. 6c shows partial multimedia service that is not included in multimedia service MS1. Therefore, if a user owns more complete decryption key bouquet and the consumable multimedia service is more complete too.

Because the encryption method is multilayered, even if an intruder has a lower decryption key, he can not get the data at the bottom layer of multimedia object unless he can solve the upper layer SMS. Therefore, this invention enhances the ability of resisting illegal usage. It provides a better DRM protection to the multimedia service and can decide the fullness of the decryption key bouquet according to the user's or consumer's degree of authorization and has the ability to form various service combinations for different multimedia objects in the same multimedia service.

Figure 7:
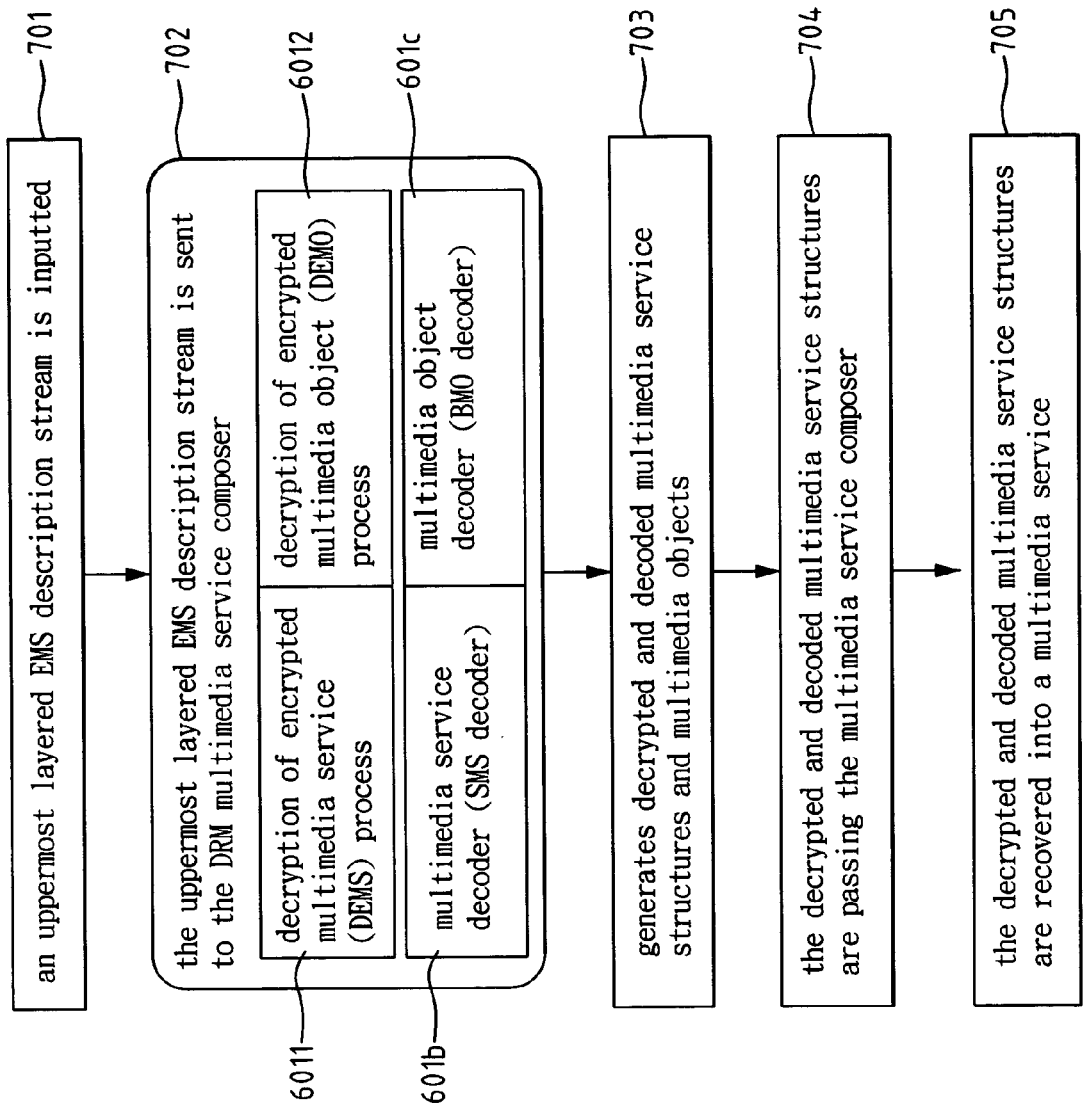
FIG. 7 shows the processing steps for the multilayered DRM decryption of the invention.

FIG. 7 shows the processing steps for the multilayered DRM decryption of the invention according to FIGS. 6a-6c mentioned above. Referring to FIG. 7, an uppermost layered EMS description stream 404 is inputted in step 701 and sent to the DRM multimedia service composer 601 in step 702 to generate decrypted and decoded multimedia service structures and multimedia objects in step 703. The decrypted and decoded multimedia service structures are recovered into a multimedia service in step 705 via the multimedia service composer 602 in step 704. The recovered multimedia service is the inputted multimedia service 401 or its partial multimedia service depending on the fullness of the decryption key bouquet that was decided by the user's or consumer's degree of authorization.

In step 702, the DRM multimedia service composer 601 performs the following works: (a) decrypting the EMS stream and the EMO stream from top layer to bottom layer according to the user's or consumer's degree of authorization and the uppermost layered EMS stream 404 in order to form respectively the stream of corresponding multimedia service structure and the stream of corresponding multimedia object, and (b) decoding every stream that describes multimedia service structure and producing a corresponding multimedia service structure, and decoding all streams of multimedia object and producing corresponding multimedia objects.

The following describes all items mentioned above in more detail by accompanying drawings.

Figure 8A:
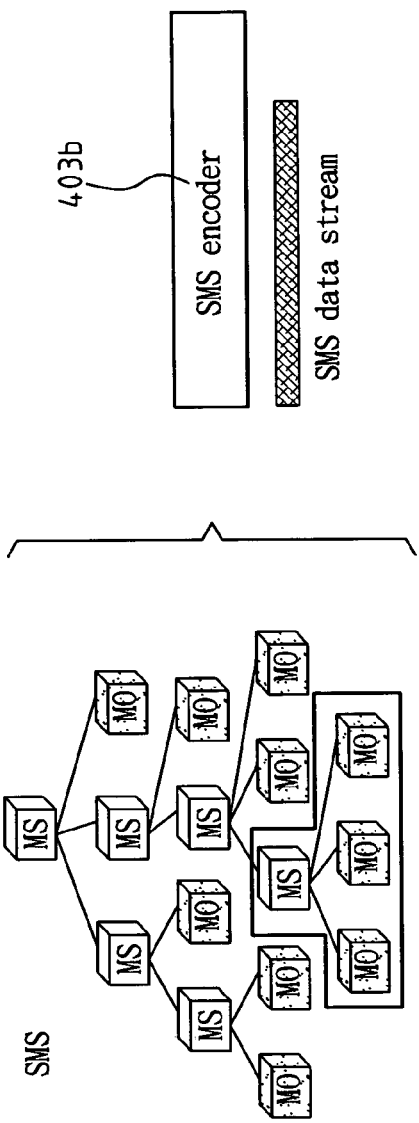
Figure 8B:
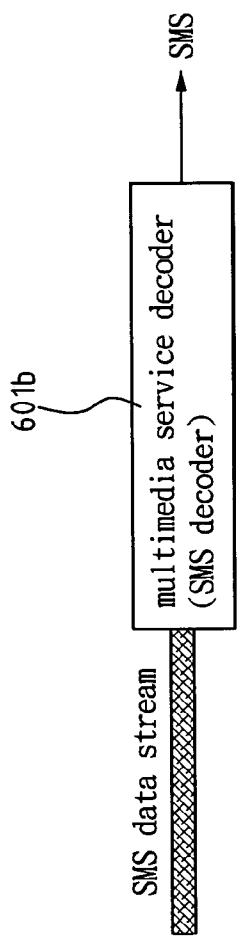

FIG. 8a and FIG. 8b show respectively the SMS encoder 403b and the SMS decoder 601b according to the invention. The SMS encoder encodes an SMS into an SMS stream and the SMS decoder decodes an SMS stream into an SMS.

Figure 9A:
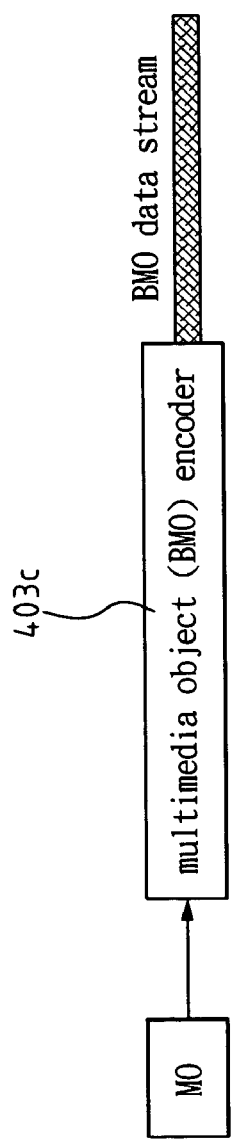
Figure 9B:
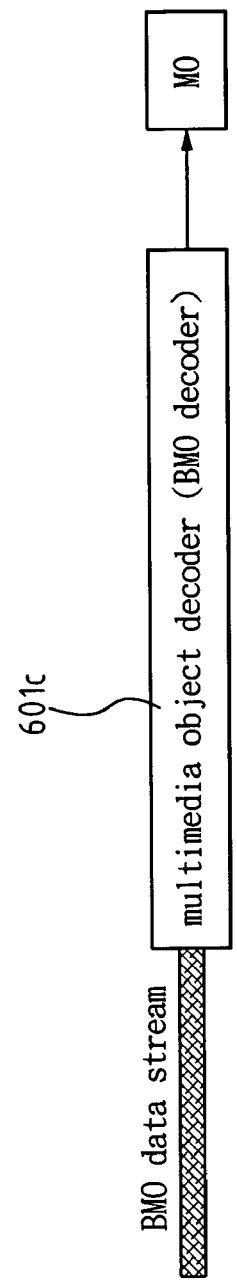

FIG. 9a and FIG. 9b show respectively the BMO encoder 403c and the BMO decoder 601c according to the invention. The BMO encoder encodes an MO into a bit-stream of MO, that is, BMO stream and the BMO decoder decodes a BMO stream into an MO.

Figure 10A:
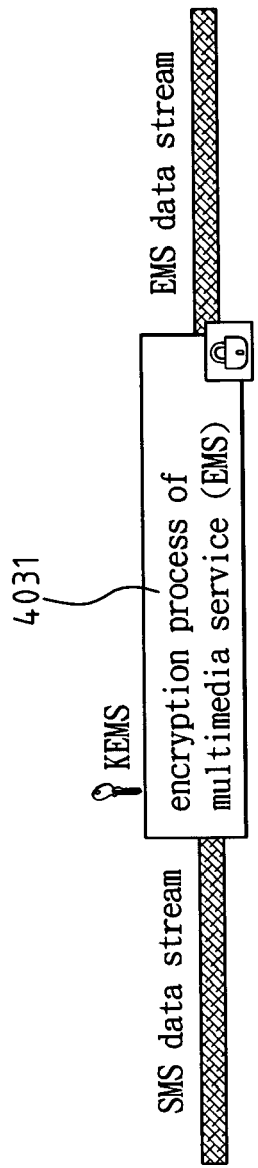
FIG. 10a shows the EMS process shown in FIG. 4a according to the invention.
Figure 10B:
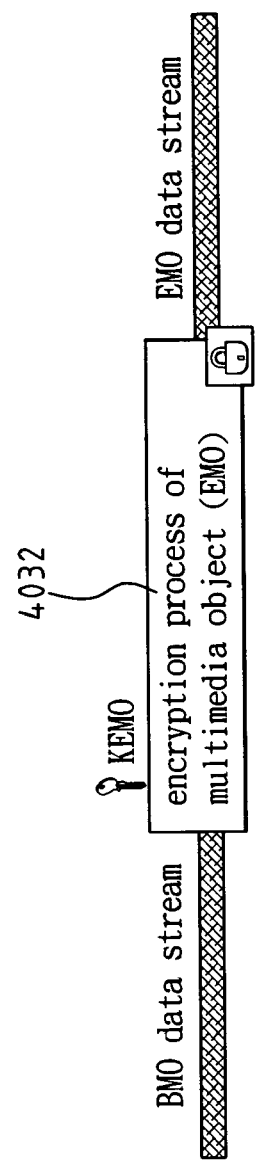
FIG. 10b shows the EMO process shown in FIG. 4a according to the invention.

FIG. 10a and FIG. 10b show respectively the EMS process 4031 and the EMO process 4032 according to the invention. The EMS process 4031 encrypts an SMS stream to a stream, that is, an EMS stream with an encryption key KEMS. The EMO process 4032 encrypts a BMO stream to a stream, that is, an EMO stream with an encryption key KEMO.

Figure 11A:
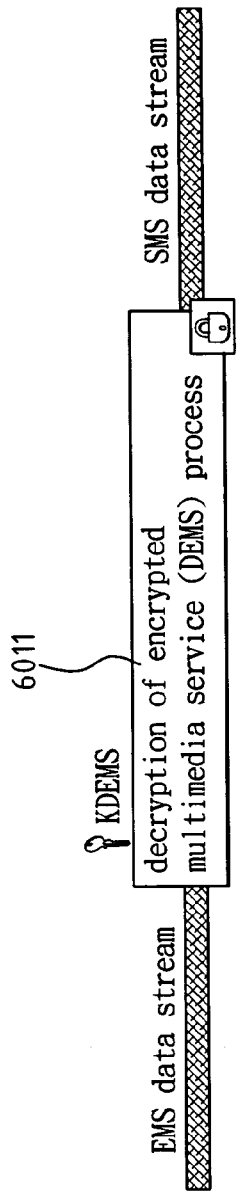
FIG. 11a shows the DEMS process shown in FIG. 6a according to the invention.
Figure 11B:
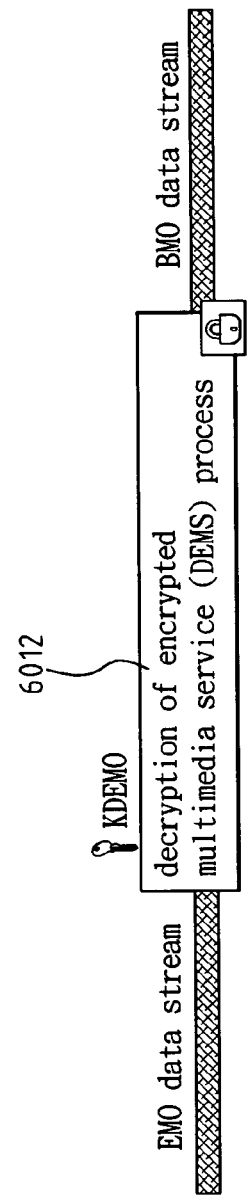
FIG. 11b shows the DEMO process shown in FIG. 6a according to the invention.

FIG. 11a and FIG. 11b show respectively a DEMS process 6011 and a DEMO process 6012 according to the invention. The DEMS process decrypts an EMS stream to an SMS stream by a decryption key KDEMS. The decryption key KDEMS is associated with the encryption algorithm of the EMS stream. The DEMO process 6012 decrypts an EMO stream to a BMO stream by a decryption key KDEMO. The decryption key KDEMO is associated with the encryption algorithm of the EMO stream.

Figure 12:
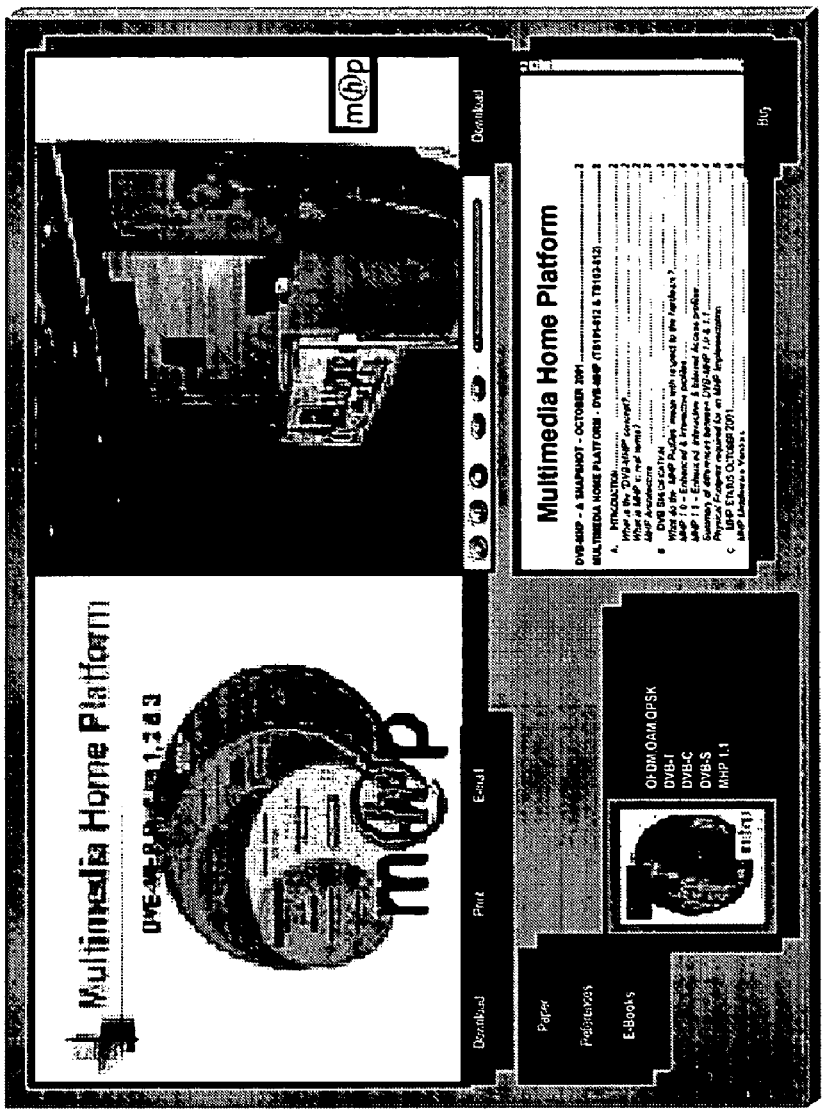
FIG. 12 shows an example of a full multimedia service.
Figure 12:
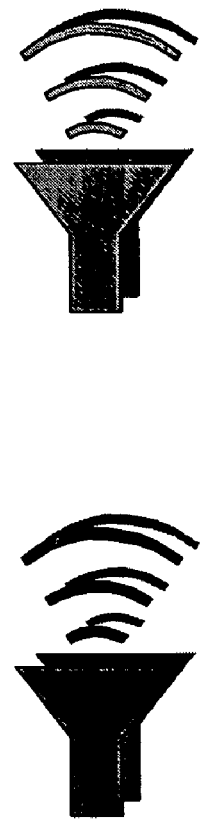
Figure 13:
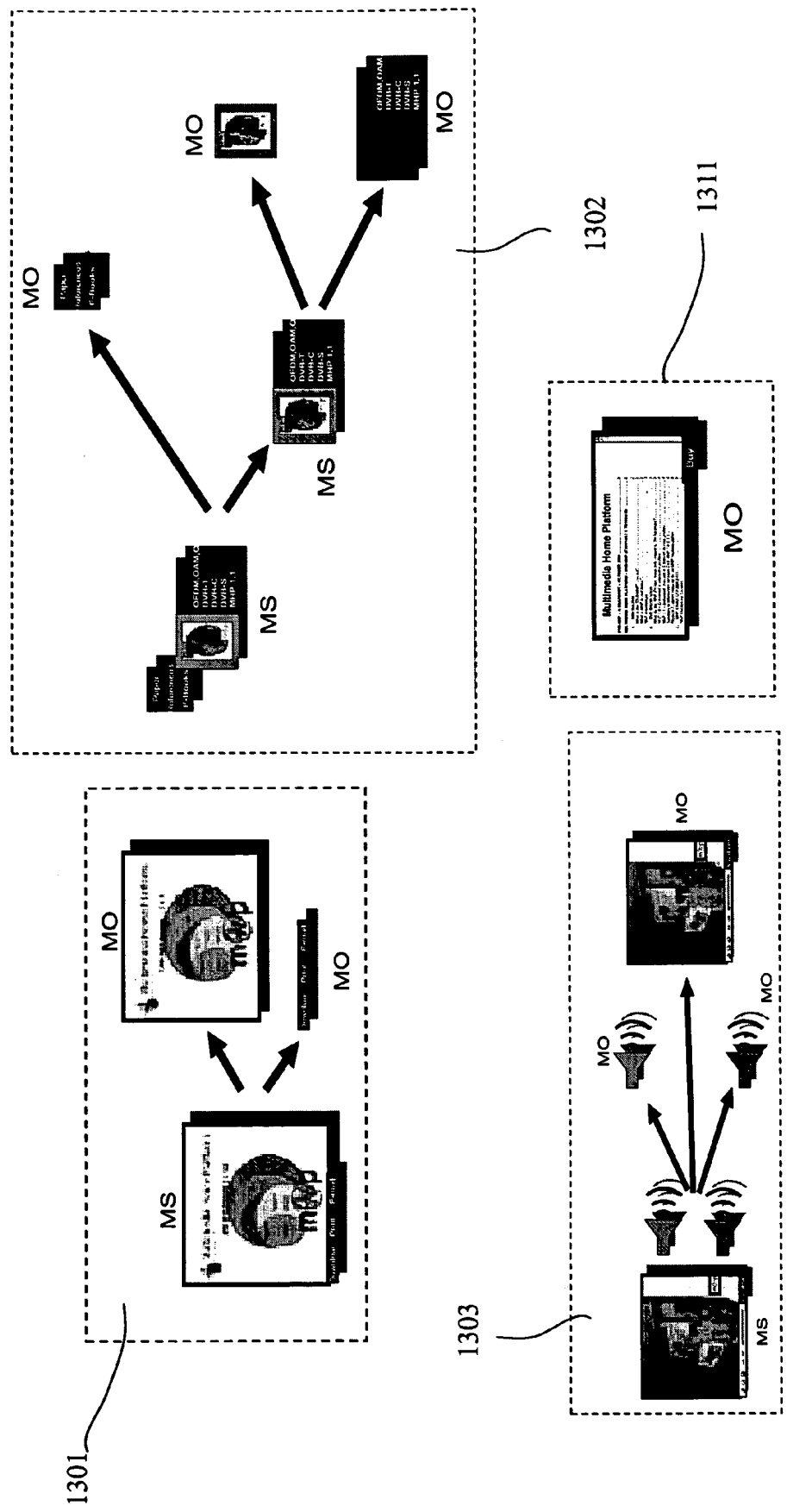
FIG. 13 shows a combination of sub-multimedia services, an object and its corresponding SMS shown in FIG. 12.

The following describes an embodiment by an example. FIG. 12 shows an example of a full multimedia service. It includes objects of audio, video, text and figure. After processing by the multimedia service decomposer 402, the full multimedia service can be decomposed into three sub-multimedia services, an object and its corresponding SMS, as shown in labels 1301-1303 and 1311 of FIG. 13.

Figure 14:
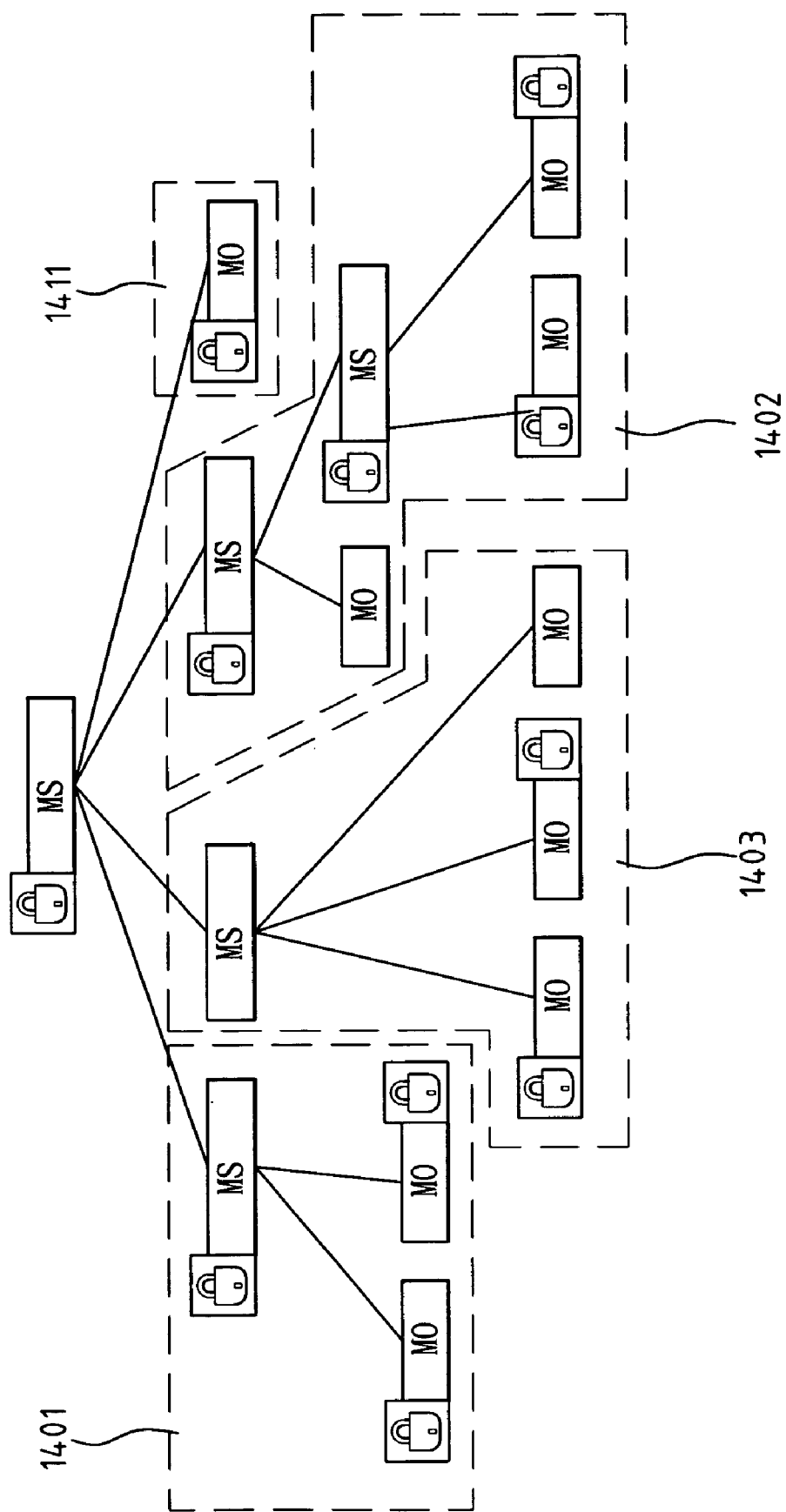
FIG. 14 shows the corresponding multilayered DRM protection structure shown in FIG. 12.

According to different combinations of the right's owner to the multimedia objects, this invention can get an encrypted uppermost layered description stream of the multilayered SMS via the multilayered DRM organizer 403. The corresponding multilayered DRM protected structure is shown in FIG. 14, wherein labels 1401-1403 and 1411 indicate multilayered DRM protection structure corresponding to labels 1301-1303 and 1311 in FIG. 13. Therefore, this invention can set up different levels of DRM protection according to different service combinations.

Figure 15:
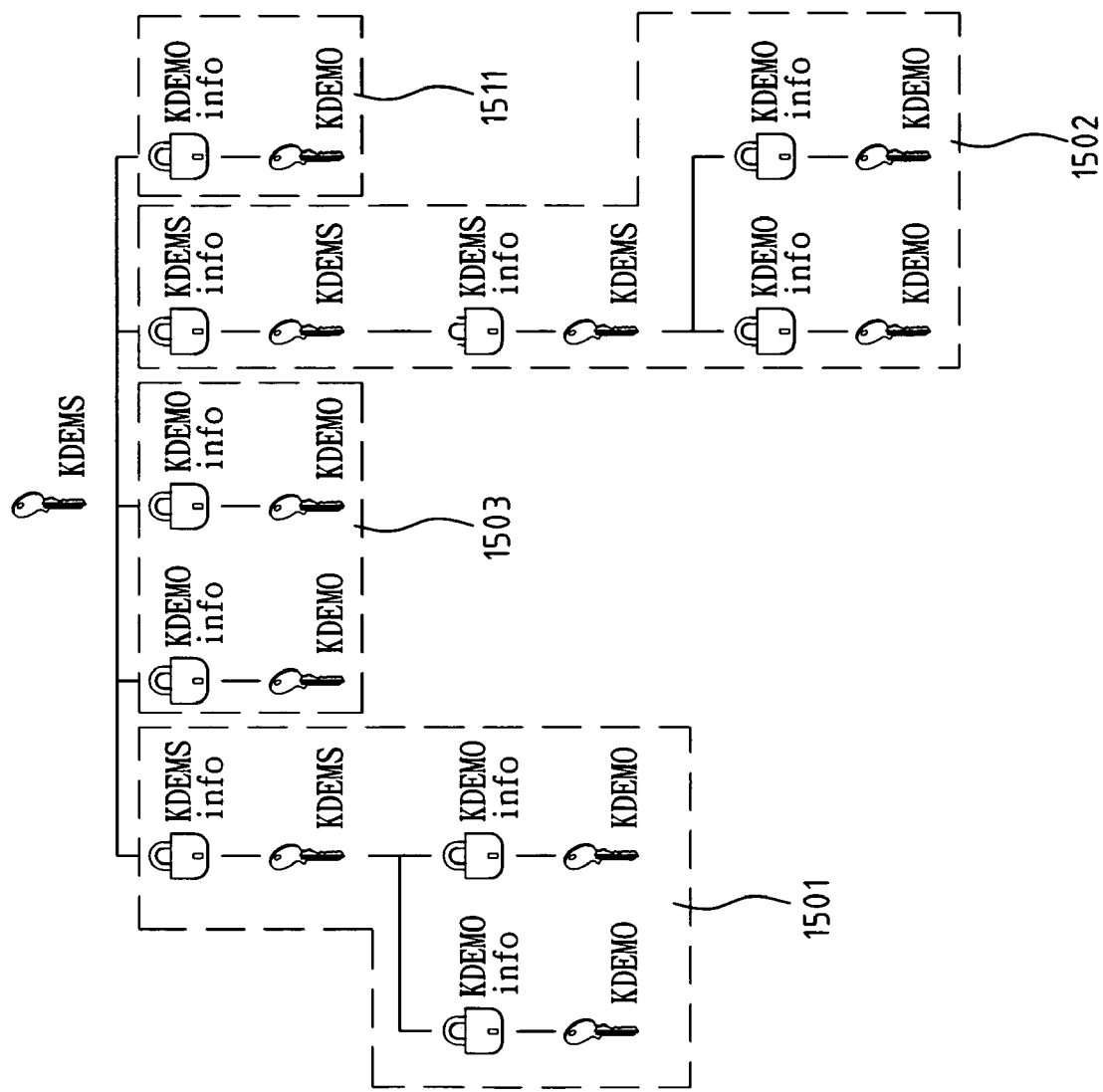
FIG. 15 shows the full decryption key bouquet corresponding to FIG. 14.

The full decryption key bouquet (FDKB) corresponding to FIG. 14 is shown in FIG. 15, wherein labels 1501-1503 and 1511 indicate the decryption key bouquet corresponding to labels 1401-1403 and 1411 in FIG. 14.

Figure 16:
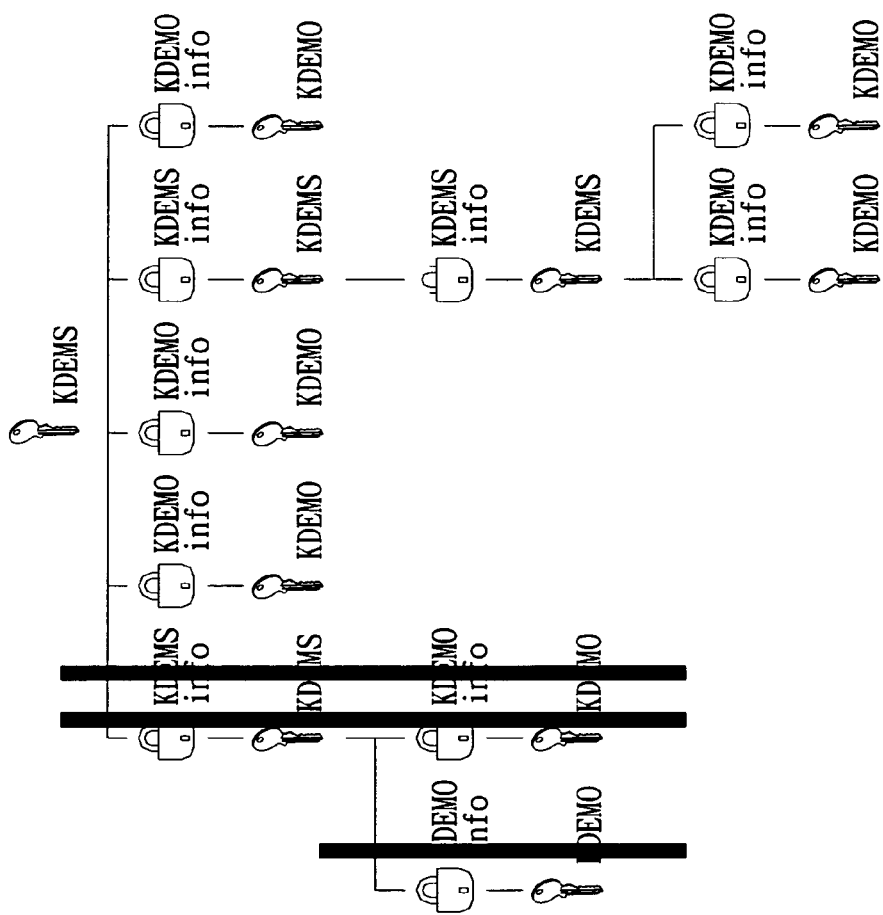
FIG. 16 shows a multimedia service lacking of slide presentation and its partial decryption key bouquet shown in FIG. 12.
Figure 16:
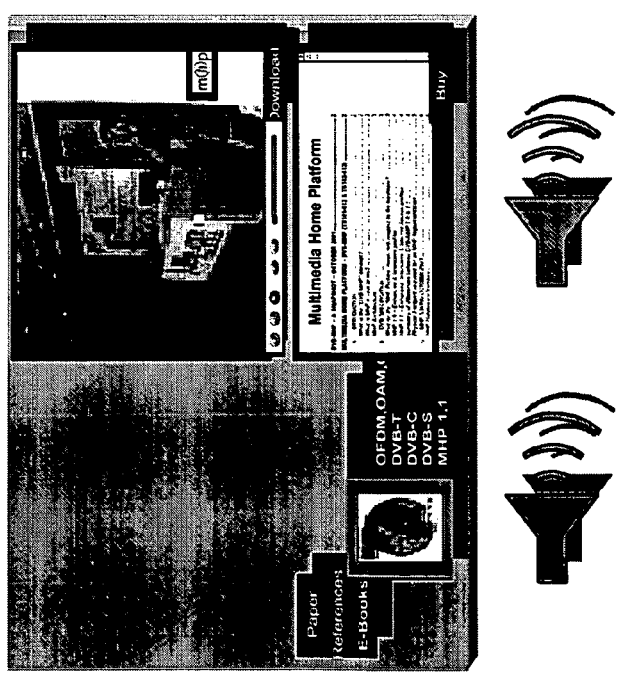
Figure 17:
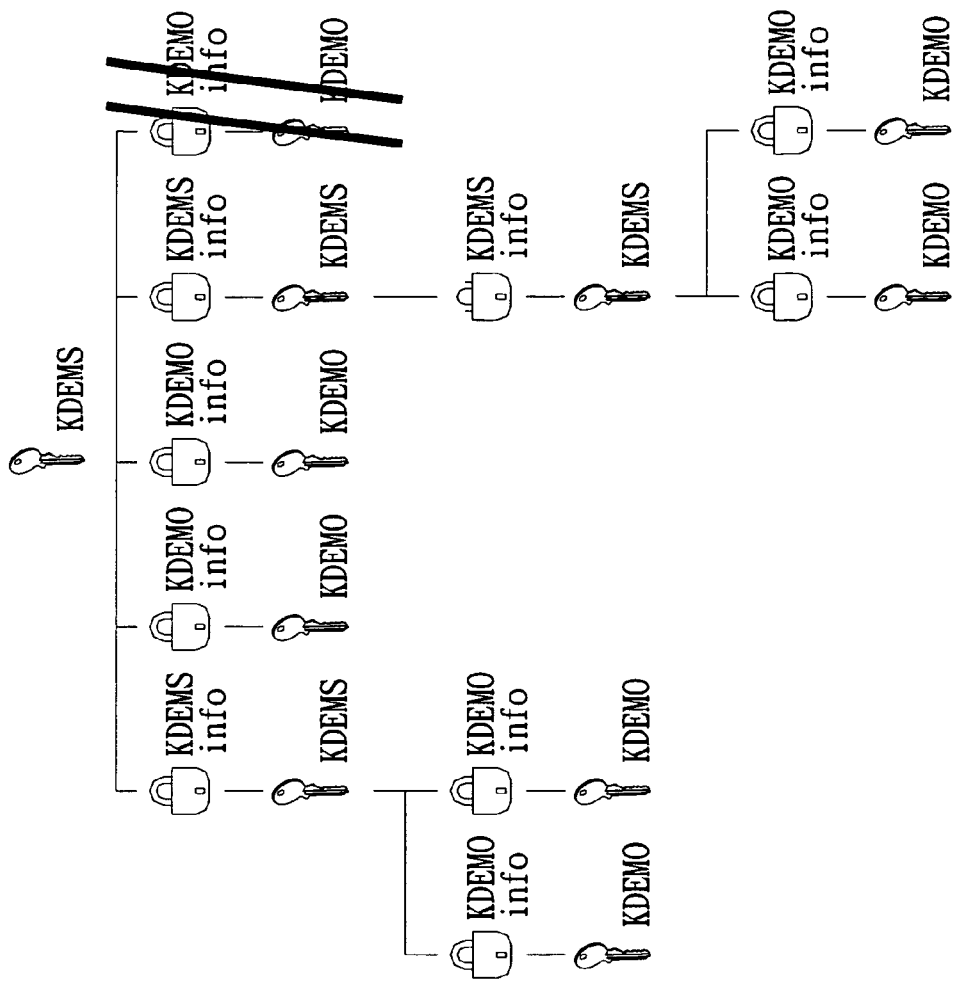
FIG. 17 shows a multimedia service lacking of text presentation and its partial decryption key bouquet shown in FIG. 12.
Figure 17:
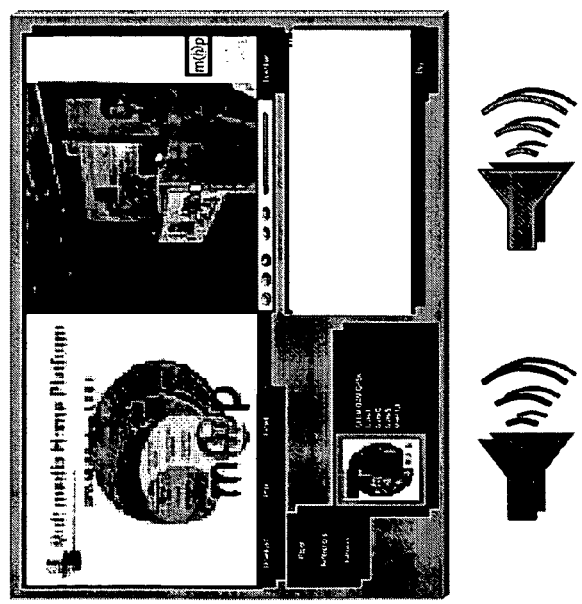

FIG. 16 shows a multimedia service lacking of slide presentation, that is, sub-multimedia service 1301, and its partial decryption key bouquet (PDKB). The partial decryption key bouquet is obtained by eliminating the decryption key bouquet 1501 from the full decryption key bouquet shown in FIG. 15. FIG. 17 shows a multimedia service lacking of text presentation, that is, sub-multimedia service 1311, and its partial decryption key bouquet. The partial decryption key bouquet is obtained by eliminating the decryption key bouquet 1511 from the full decryption key bouquet shown in FIG. 15.

Figure 18:
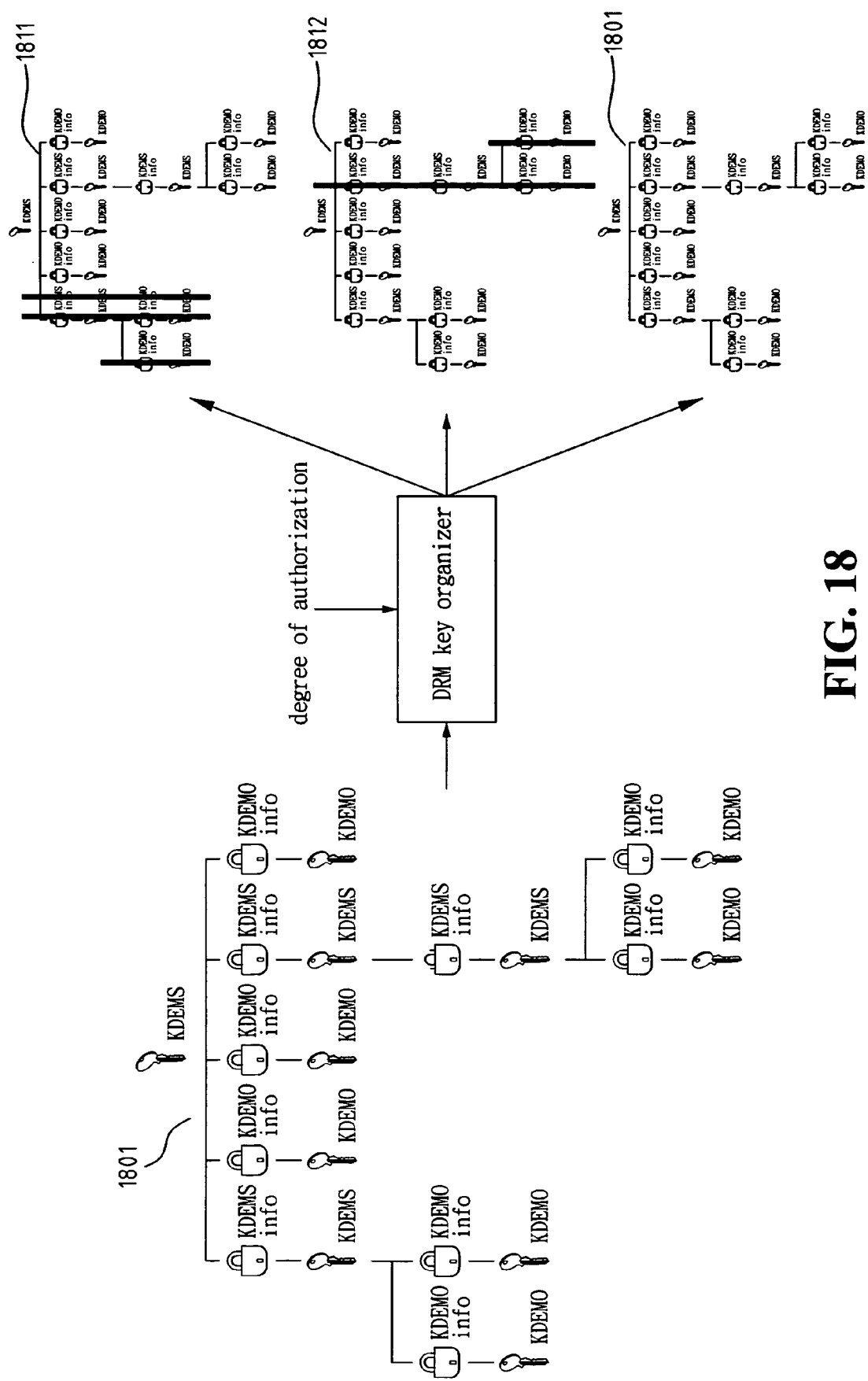
FIG. 18 shows the processing steps of the DRM key organizer according to the present invention.

Accordingly, this invention can further include a DRM key organizer (DKO). The DKO transforms a full decryption key bouquet to a full decryption key bouquet or its partial decryption key bouquet depending on the user's or consumer's degree of authorization, as shown in FIG. 18. Label 1801 indicates a full decryption key bouquet and label 1811 and 1812 indicate respectively two partial decryption key bouquets. Therefore, this invention can decide the fullness of the decryption key bouquet according to the user's or consumer's degree of authorization and has the ability to form various service combinations for different multimedia objects in the same multimedia service.

In summary, the multilayered DRM protection structure of the invention not only provides more complex level of encryption to enhance the protection strength for multimedia information but also provides the multimedia service application the ability of various service compositions and more degrees of freedom on DRM protection. Moreover, it decides the fullness of the decryption key bouquet according to the user's or consumer's degree of authorization to achieve the ability of forming various service combinations for different multimedia objects in the same multimedia service.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An architecture of multilayered digital rights management (DRM) protection structure for multimedia service, comprising:
    a multilayered DRM encryption structure; and
    a multilayered DRM decryption structure;
    wherein said multilayered DRM encryption structure further comprises:
    an inputted full multimedia service;
    a multimedia service decomposer decomposing said full multimedia service into at least one individual multimedia service or multimedia object and producing a multilayered structure of multimedia service (multilayered SMS) for said full multimedia service; and
    a multilayered DRM organizer producing a multilayered DRM protection structure according to different combinations of said at least one individual multimedia service or multimedia object by a right's owner, then encrypting and encoding an uppermost layered stream of said multilayered SMS;
    and said multilayered DRM decryption structure further comprises:
    a DRM multimedia service composer decrypting and decoding said uppermost layered stream of said multilayered SMS according to a user's or consumer's degree of authorization to generate a decrypted and decoded multilayered multimedia service structure; and
    a multimedia service composer recovering said decrypted and decoded multilayered multimedia service structure into a multimedia service.

2. The architecture of multilayered DRM protection structure as claimed in claim 1, said multimedia object is a presentation of natural or artificial audio, video, figure, image, text and other multimedia source.

3. The architecture of multilayered DRM protection structure as claimed in claim 1, wherein said multilayered SMS describes how an individual multimedia service and an individual multimedia object of a lower layer combine to make a multimedia service of a higher layer for said full multimedia service.

4. The architecture of multilayered DRM protection structure as claimed in claim 1, wherein said multilayered SMS corresponds to a full decryption key bouquet of said inputted full multimedia service.

5. The architecture of multilayered DRM protection structure as claimed in claim 4, further comprising a DRM key organizer to transform a full decryption key bouquet to a full decryption key bouquet or its partial decryption key bouquet depending on the user's or consumer's degree of authorization, said partial decryption key bouquet being obtained by eliminating the corresponding decryption key bouquet of an unauthorized multimedia object or multimedia service from the full decryption key bouquet.

6. The architecture of multilayered DRM protection structure as claimed in claim 1, wherein said multilayered DRM organizer further comprises:
    multimedia object bit-stream encoder for encoding a multimedia object into a stream of multimedia object; and
    a structure of multimedia service (SMS) encoder for encoding a SMS into a stream of SMS.

7. The architecture of multilayered DRM protection structure as claimed in claim 1, wherein said multilayered DRM organizer uses a multimedia service encryption process and a multimedia object encryption process to protect and encrypt said multilayered SMS into a stream of encrypted multilayered SMS.

8. The architecture of multilayered DRM protection structure as claimed in claim 7, wherein said DRM multimedia service composer uses a multimedia service decryption process and a multimedia object decryption process to decrypt said stream of encrypted multilayered SMS.

9. The architecture of multilayered DRM protection structure as claimed in claim 8, wherein said multilayered DRM organizer uses respectively a corresponding multimedia service decryption key and a corresponding multimedia object decryption key to each multimedia service decryption process and each multimedia object decryption process, and decrypts every stream of encrypted multimedia service and every stream of encrypted multimedia object to form respectively a corresponding stream of multimedia service structure and a corresponding stream of multimedia object.

10. The architecture of multilayered DRM protection structure as claimed in claim 9, wherein every multimedia service decryption key is associated with a corresponding encryption algorithm of a stream of encrypted multimedia service, and every multimedia object decryption key is associated with a corresponding encryption algorithm of a stream of encrypted multimedia object.

11. The architecture of multilayered DRM protection structure as claimed in claim 7, wherein said multilayered DRM organizer uses respectively a corresponding multimedia service encryption key and a corresponding multimedia object encryption key to each multimedia service encryption process and each multimedia object encryption process, and encrypts every stream of multimedia service structure and every stream of multimedia object to form respectively a corresponding stream of encrypted multimedia service and a corresponding stream of encrypted multimedia object.

12. The architecture of multilayered DRM protection structure as claimed in claim 11, wherein every stream of encrypted multimedia service and every stream of encrypted multimedia object are respectively associated with a corresponding encryption algorithm.

13. The architecture of multilayered DRM protection structure as claimed in claim 1, wherein said DRM multimedia service composer further comprises:
   a structure of multimedia service decoder (SMS decoder) decoding a description stream of multimedia service structure and producing a multimedia service structure; and
   a multimedia object bit-stream decoder decoding a described stream of multimedia object and producing a multimedia object.

14. A method of for multimedia service with multilayered digital rights management (DRM) protection structure, comprising the steps of:
   (a) performing a multilayered DRM encryption process including the steps of decomposing an inputted full multimedia service into at least one individual multimedia service or multimedia object, generating a multilayered structure of multimedia service (multilayered SMS) for said full multimedia service, producing a multilayered DRM protection structure according to different combinations of said at least one individual multimedia service or multimedia object by a right's owner, then encrypting and encoding an uppermost layered stream of said multilayered SMS; and
   (b) performing a multilayered DRM decryption process including the steps of decrypting and decoding said uppermost layered stream of said multilayered SMS according to a user's or consumer's degree of authorization to generate a decrypted and decoded multilayered multimedia service structure, and recovering said decrypted and decoded multilayered multimedia service structure into a multimedia service.

15. The method of for multimedia service with multilayered digital rights management (DRM) protection structure as claimed in claim 14, wherein the step of decrypted and decoded multilayered multimedia service structure includes: generating said multilayered SMS for said full multimedia service further includes encoding each individual multimedia object in said multilayered SMS into a corresponding stream of said multimedia object, encoding each multimedia service structure into a corresponding stream of multimedia service structure, and deciding which stream of multimedia service structure and which stream of multimedia object need to be protected and encrypted.

16. The method of for multimedia service with multilayered digital rights management (DRM) protection structure as claimed in claim 15, wherein the step of generating decrypted and decoded multilayered multimedia service structure includes decrypting each stream of encrypted multimedia service structure and each stream of encrypted multimedia object from a top layer to a bottom layer according to a user or consumer owned decryption key bouquet and said uppermost layered stream of said multilayered SMS to form respectively a corresponding stream of multimedia service structure and a corresponding stream of multimedia object, decoding every stream of multimedia service structure to produce a corresponding multimedia service structure, and decoding every stream of multimedia object to produce a corresponding multimedia object.

* * * * *